United States Patent
Bouet et al.

(10) Patent No.: US 8,049,132 B2
(45) Date of Patent: Nov. 1, 2011

(54) METHOD OF REPAIRING A BLISK AND TEST PIECES BY WELDING

(75) Inventors: Bernard Bouet, Gretz Armainvilliers (FR); Gerard Derrien, Houilles (FR); Stephane Michel Kerneis, Velizy (FR); Claude Andre Charles Pagnon, Vaux sur Mer (FR); Eric Christian Jean Pinto, Fleury en Biere (FR)

(73) Assignee: SNECMA et SNECMA Services, Paris (FR)

( * ) Notice: Subject to any disclaimer, the term of this patent is extended or adjusted under 35 U.S.C. 154(b) by 1270 days.

(21) Appl. No.: 11/360,658

(22) Filed: Feb. 24, 2006

(65) Prior Publication Data
US 2006/0193612 A1    Aug. 31, 2006

(30) Foreign Application Priority Data
Feb. 25, 2005  (FR) ................................ 05 50518

(51) Int. Cl.
*B23K 26/00* (2006.01)
*B23P 17/04* (2006.01)
*B23P 6/00* (2006.01)

(52) U.S. Cl. ......... 219/121.64; 219/121.63; 219/121.65; 219/121.66; 219/121.84; 29/592; 29/888.021; 29/889.1; 29/889.2; 29/889.7

(58) Field of Classification Search ............. 219/121.64, 219/121.63, 121.65, 121.66, 121.84; 29/592, 29/888.021, 889.1, 889.2, 889.7, 889.71
See application file for complete search history.

(56) References Cited

U.S. PATENT DOCUMENTS

| | | | | |
|---|---|---|---|---|
| 2,178,441 | A | * | 10/1939 | Swanson ........................ 409/171 |
| 4,730,093 | A | | 3/1988 | Mehta et al. |
| 5,038,014 | A | | 8/1991 | Pratt et al. |
| 5,142,778 | A | * | 9/1992 | Smolinski et al. ........... 29/889.1 |
| 6,269,540 | B1 | | 8/2001 | Islam et al. |
| 6,326,585 | B1 | * | 12/2001 | Aleshin et al. ........... 219/121.63 |
| 6,568,077 | B1 | * | 5/2003 | Hellemann et al. .......... 29/889.1 |
| 6,727,459 | B1 | * | 4/2004 | Bialach ..................... 219/121.64 |
| 2008/0000947 | A1 | | 1/2008 | Derrien et al. |

FOREIGN PATENT DOCUMENTS

| | | |
|---|---|---|
| DE | 38 13 157 A1 | 12/1988 |
| EP | 0 504 095 A3 | 9/1992 |
| EP | 1 491 281 A3 | 12/2004 |

OTHER PUBLICATIONS

U.S. Appl. No. 11/457,992, filed Jul. 17, 2006, Bouet, et al.

* cited by examiner

*Primary Examiner* — Henry Yuen
*Assistant Examiner* — Ket D Dang
(74) *Attorney, Agent, or Firm* — Oblon, Spivak, McClelland, Maier & Neustadt, L.L.P.

(57) ABSTRACT

A method of repairing a turbomachine blisk having at least one damaged zone by build-up of metal in the damaged zone using a laser build-up welding machine is disclosed. The method includes preparing the damaged zone by machining the damaged zone to obtain a zone of defined profile to be repaired, build-up welding of a start-of-run test piece that includes the defined profile using the laser build-up welding machine, checking geometric and metallurgical quality of the test piece, and build-up welding the zone to be repaired of the blisk using the laser build-up welding machine.

19 Claims, 2 Drawing Sheets

METHOD OF REPAIRING A BLISK AND TEST PIECES BY WELDING

BACKGROUND OF THE INVENTION

The present invention relates to the field of turbomachines, especially aeronautical turbomachines, and is intended for the repair of moving bladed discs.

To meet the increased performance requirements of engines, one-piece bladed discs or wheels, called "blisks", are now manufactured from titanium alloy for the compressors of turbojet engines. In a conventional rotor, the blades are retained by their root, which is fitted into a housing made on the rim of the disc. The discs and blades are therefore manufactured separately before being assembled into a bladed rotor. In a blisk, the blades and the disc are machined directly from a forged blank—they form a single part. This technique permits substantial savings in the total weight of the engine to be made, but also substantial reductions in manufacturing costs. Fretting problems on the blade routes and cavities in service no longer exist.

However, this type of rotor has the drawback of being difficult to repair. In operation, the compressor blades may undergo damage due to impacts caused by the ingestion, via the engine, of foreign bodies or else due to erosion caused by dust and other particles entrained by the air flowing through the engine and coming into contact with the surface of the blades. This wear or damage, if it cannot be repaired according to the criteria specified in the manufacturer's documentation, involves replacing one or more defective blades. In the case of one-piece bladed components, the blades are integral parts of a massive component and, unlike in conventional arrangements, they cannot be replaced or even removed in order to be repaired individually. It is necessary to repair the part directly on the disc. The repair must therefore take into account all aspects of the component, with its size, its weight and, in the case of large components, accessibility to the zones to be repaired.

Thus, in the case of a blisk, the regions generally concerned by repair are, for each blade, the tip, the aerofoil corner on the leading edge side, the aerofoil corner on the trailing edge side, the leading edge and the trailing edge. The blades are of what is called a three-dimensional design, with the particular feature of having a shape that changes in three directions and a variable thickness along this changing profile. The maximum extent of the zones able to be repaired takes into account the use of the engines and of the aerodynamic loads supported by the components.

The repair techniques that have been developed consist in removing the damaged region on the damaged blades and then in replacing the removed portion with a part of suitable shape, or else by build-up welding. These techniques generally employ a conventional machining operation, for removing the damaged portion, contactless inspection of the repaired part, ultrasonic peening and specific machining for re-work of the repaired zone.

The present invention relates to repair by build-up welding.

Repair is particularly difficult to carry out in the case of certain alloys used, the welding of which results in the formation of volume defects. This is especially so for the titanium alloy Ti17. This alloy is mentioned for example in the Applicant's patent application EP 1 340 832, which relates to a product, such as a blade, made of this material. When performing build-up welding, the TIG or microplasma techniques conventionally and widely used in the aeronautical industry do not allow titanium Ti17 to be treated under conditions allowing acceptable results to be achieved.

These conventional build-up welding techniques result in the formation of defects. Thus, TIG build-up welding, employing a substantial amount of energy compared with the small thickness involved, generates strains and leads to the formation of a large number of pores, such as micropores or microblisters, and also an extended heat-affected zone (HAZ). These micropores, which are not very easily detectable, generate a weakening in the mechanical properties by up to 80%. Such weakening in the behaviour of the components in operation is unacceptable, and this type of build-up welding cannot be applied. Microplasma build-up welding results in the formation of a smaller HAZ, but it is still relatively large. Furthermore, the method requires particular attention and a periodic inspection of the equipment and products used, so that no operating parameter of the machine drifts and modifies the expected results.

U.S. Pat. No. 6,568,077 describes a method of repairing a blade on a blisk in which the damaged portion of the blade is machined and then, in a first operating mode, the missing portion is built up by deposition of metal by means of a tungsten-electrode arc-welding (TIG) machine. In a second operating mode, an insert is welded by means of an electron-beam welding machine. The profile of the blade is then restored by appropriate machining. However, this method does not mention the problem encountered when welding certain titanium alloys.

The Applicant has found that the use of a build-up welding technique by application of a laser beam obviates the problems encountered by the usual techniques. In particular, laser build-up welding appears to be a technique that minimizes the defects in the weld zone.

Laser build-up welding is already known and used, for example in applications where metal contours have to be generated, especially from CAD data. The walls have a thickness of between 0.05 and 3 mm and the layers are 0.05 to 1 mm in height. The technique makes it possible to achieve excellent metallurgical bonding to the substrate.

The technique of build-up welding by means of a laser beam has the following advantages: the heat influx is constant over time. Heat has no time to accumulate within the volume and to diffuse—it follows that there is little outgassing in the case of titanium and a limited reduction in strength. Furthermore, the repeatability and reliability of this technique are good, once the machine parameters have been set, and it is easily controlled.

The laser techniques currently employed involve simultaneously adding filler material and radiating the substrate with the laser beam. The material is generally deposited in the work zone in the form of a powder or a metal wire. In other versions, it is sprayed in the form of powder jets into the work zone using a suitable nozzle.

BRIEF SUMMARY OF THE INVENTION

One subject of the invention is therefore a method of repairing a one-piece bladed disc using a build-up welding technique.

According to the invention, the method of repairing a turbomachine one-piece bladed disc or blisk having at least one damaged zone, by build-up of metal in said damaged zone by means of a welding machine, which comprises the steps of preparing the damaged zone, of building up the zone with metal and of re-work of the repaired zone by machining, is characterized in that:

the preparation step comprises the machining of the damaged zone so as to obtain a zone of defined profile to be repaired;

the build-up welding operation is carried out on a test piece, called start-of-run test piece, having said defined profile, using a welding machine, which is a laser-type machine and the operating parameters of which are preset;

the quality of the test piece after build-up welding is checked; and, if the quality of the test piece corresponds to the repair acceptance criteria, the zone to be repaired is built up using the same welding machine without changing the operating parameters thereof.

The present invention has the advantage of allowing one-piece bladed discs to be repaired on an industrial scale by being based on the ability to control the build-up welding installations in which the heating is performed by a laser beam. Once the installation has been validated and the parameters set, all that is required is to check, by the prior treatment of a test piece, that the parameters are correct and have not drifted. Surprisingly, it has been found that this method allows great reliability in the repair of components as complex as blisks. The prior check is sufficient for authorizing a number of blades on the same disc to undergo build-up welding.

According to another feature, and to ensure in a complementary manner that the operation is performed properly, the method includes, after the zone to be repaired or the various successive zones to be repaired have been build-up welded, a step of build-up welding what is called an end-of-run test piece and a step of checking the quality of the end-of-run test piece.

The method is particularly suitable when the constituent metal of the disc is a titanium alloy, especially Ti17.

The nature of the build-up metal is not limited, but preferably the build-up weld metal is a titanium alloy, especially Ti17 or TA6V.

The method applies to at least one zone to be repaired from among blade tips, leading-edge or trailing-edge corners and leading or trailing edges.

According to another feature, the method of repairing a blisk includes a step of regulating the build-up welding installation, during which step the parameters are preset, by build-up welding a regulating test piece, followed by non-destructive and destructive tests for checking the quality of the build-up effected.

In particular, the regulating test piece has a profile corresponding to that of an aerofoil leading or trailing edge zone of said disc to be build-up welded. The inspection includes a fatigue test carried out on a test specimen machined from the test piece after the build-up welding step.

The invention also relates to the start-of-run or end-of-run test piece for implementing the method. It is characterized by the fact that it is made of a titanium alloy the shape of which simulates the tip of an aerofoil with a sealing lip.

The invention also relates to a start-of-run or end-of-run test piece for implementing the method, made of a titanium alloy, the shape of which simulates a leading edge or trailing edge corner of an aerofoil tip machined according to said predetermined model.

BRIEF DESCRIPTION OF THE DRAWINGS

The method will now be described in greater detail with reference to the appended drawings in which.

DETAILED DESCRIPTION OF THE INVENTION

Figure 1:
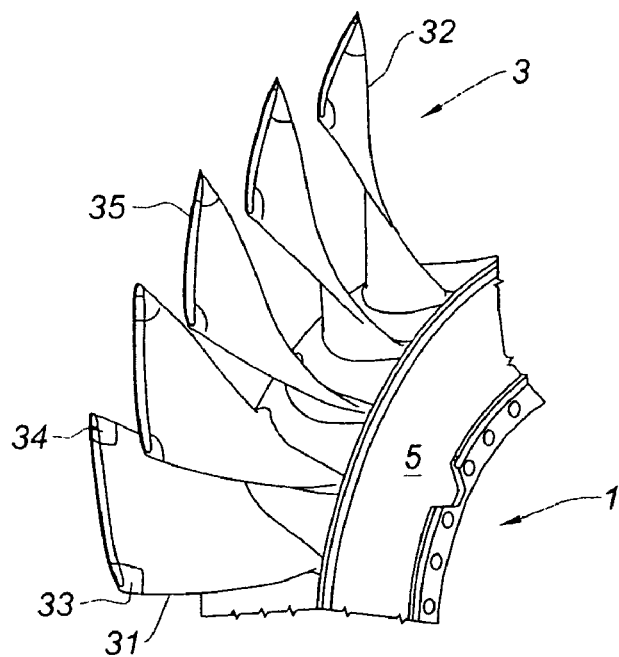
FIG. 1 shows a partial view of a one-piece bladed disc.

FIG. 1 shows part of a one-piece bladed disc 1. The blades 3 are radial and distributed around the periphery of a disc 5. The assembly is a one-piece assembly in the sense that it is manufactured either by machining from a single blank or by welding at least part of its components. The blades in particular are not joined to the disc by disconnectable mechanical means. The zones liable to be damaged are the leading edges 31, the trailing edges 32, the leading edge corners 33, the trailing edge corners 34 and the line of the aerofoil tip 35 provided with a thinned portion forming a sealing lip as is known.

The damage observed depends on the position of the zone. On the leading edge, IS trailing edge or aerofoil corner for example, this may be a loss of material caused by the impact of a foreign body or else a crack. At the aerofoil tip, this is more often wear due to rubbing with the engine casing. For economic and industrial reasons, it is desirable to standardize the operations for repairing these discs. Thus, after having checked whether repair is possible, a standardized machining operation is carried out on the zone or zones damaged. The decision to repair or not depends in particular on the size or extent of the fault revealed.

Depending on the damaged zone, a quantity of material is removed in such a way that the geometry and the dimensions of the zone to be repaired are always the same. This shaping operation is performed by mechanical machining, especially by milling using a suitable tool, in a range ensuring a surface finish compatible with the desired quality of the build-up welding.

A welding surface intended to receive the filler metal is then cleaned, both mechanically and chemically. This cleaning is tailored to the material of the substrate. This is important in the case of the titanium alloy Ti17 in particular, or the alloy TA6V.

Figures 2A, 2B:
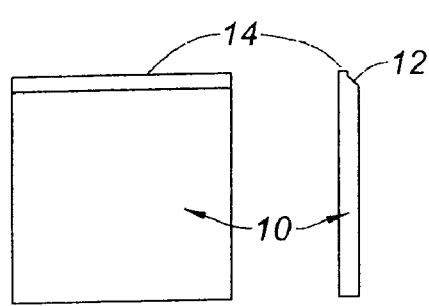
FIGS. 2a and 2b show a start-of-run or end-of-run test piece used for implementing the method of the invention for repairing aerofoil tips, in a front-on view and in a side-on view.

A start-of-run test piece is build-up welded. FIGS. 2a and 2b show a test piece 10 corresponding to the build-up welding of an aerofoil tip. This test piece, in the form of a rectangular plate with a constant thickness and a length for example of 44 mm, has characteristics common to the zone to be repaired:

it is preferably made of the same material; and it has the same surface, geometrical, thermal and metallurgical characteristics.

FIG. 2b shows, side on, an edge of the plate whose geometry is the same as that of the aerofoil tip after machining in the zone to be repaired. This tip comprises a part 12 of curved shape and a part 14 representing the base of the sealing lip at the start of the radiasing. The thickness is that of the aerofoil tip.

Figures 3A, 3B:
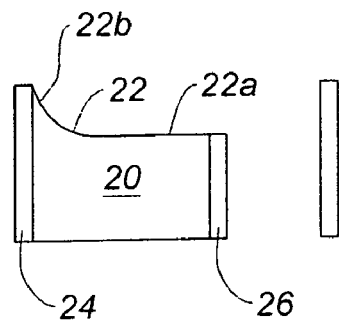
FIGS. 3a and 3b show a start-of-run or end-of-run test piece used for implementing the method of the invention for repairing aerofoil tip corners, in a front-on view and in a side-on view.

FIGS. 3a and 3b show a test piece for repairing an aerofoil leading-edge or trailing-edge corner. The test piece 20 is in the form of a rectangular plate of constant thickness. The plate has been cut to the profile 22, which is the same as that of the zone to be repaired after machining the aerofoil tip corner. The profile comprises a straight part 22a close to the aerofoil tip and parallel to the leading or trailing edge. The straight part 22a is extended by a curved part 22b that terminates on the leading or trailing edge. The test piece 20 has an integral first root 24 representative of the join of the part 22b to the leading or trailing edge of the aerofoil and a second root 26 representative of the join of the part 22a to the aerofoil tip.

Figure 4:
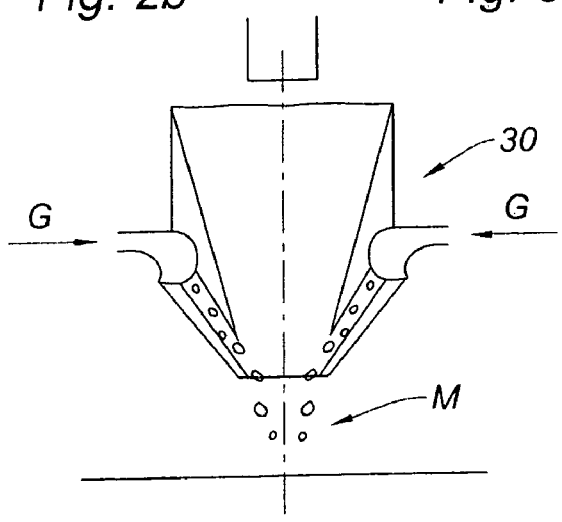
FIG. 4 shows a longitudinal section of a laser build-up welding nozzle.

FIG. 4 shows a laser build-up welding nozzle 30. This nozzle has channels for feeding a metal powder to be deposited on the zone to be repaired along the laser beam propagation axis. The beam is directed onto the part and the metal powder M is entrained by a stream of gas G into the zone heated by the beam.

The nozzle moves along the zone to be repaired in a two-and-fro movement, progressively building up a stack of layers of material deposited and melted by the laser beam. The build-up welding is carried out with a constant speed and intensity, even if the thickness varies along the part.

The parameters are adapted, in particular so as to limit the internal strains and any remachining, and also the extent of the heat-affected zone (HAZ). The parameters to be taken into account in the build-up welding are:

the height of the focal point of the laser beam (preferably a YAG laser) above the surface;
the speed of advance of the head 30;
the energy applied by the beam;
the powder used (Ti17 or TA6V) which is not necessarily the same metal as the substrate, its particle size, which is preferably between 30 and 100 µm, and its focal point; and
the nature of the entrainment or confinement gas, which is preferably helium or argon.

The type of nozzle to be used is defined beforehand. The speed and energy are dependent on the type of machine employed.

In particular, in the case of titanium Ti17, to prevent the appearance of porosity within the volume, it has been found that the parameters must not vary by more than ±5%.

The continuity of deposition of layers, their thickness and their width are checked visually. The aim is to detect traces of oxidation which would be due to poor shielding by the confinement gas, any lack of bonding, cracks (under a binocular microscope) and unfused material.

When the build-up welding of the test piece is considered to be good, the machine parameters are validated. A variation of 5% is permitted.

The next step is the repair of the zones to be build-up welded on the part or parts, depending on the case. All the prepared zones that are based on the same type of zone and which corresponds to that of the test piece are repaired.

A simple visual inspection of the build-up welded zone is made. This is because it is not possible to use destructive inspection techniques or techniques that require a lot of room, which is not available on a blisk.

The end-of-run test piece is produced under the same welding conditions as the previous steps so as to obtain a result representative of the repair made to the blades of the blisk.

The inspection made on the end-of-run test piece allows the repair of the blisk in question to be validated or not. This inspection includes a metallographic appraisal, searching for blisters, these being cavities formed by the gas released by the metal. In the case of Ti17 titanium, the microblisters may be as small as 5 µm to 100 µm and are not detectable by simple radiography. The density of micropores observed during the metallographic appraisal is a key factor for accepting the repair.

Once the build-up welding has been completed, the heat treatment and machining rework operations complete the repair. These operations are conventional.

It should be noted that particular attention must be paid during the heat treatment so as not to generate contaminations.

The invention also relates to the validation of a laser welding installation for implementing the build-up welding repair method. This is because, before bringing a machine into service and dedicating it to repairing the blisk by build-up welding, it is necessary to carry out a run for regulating the welding parameters.

Figure 5:
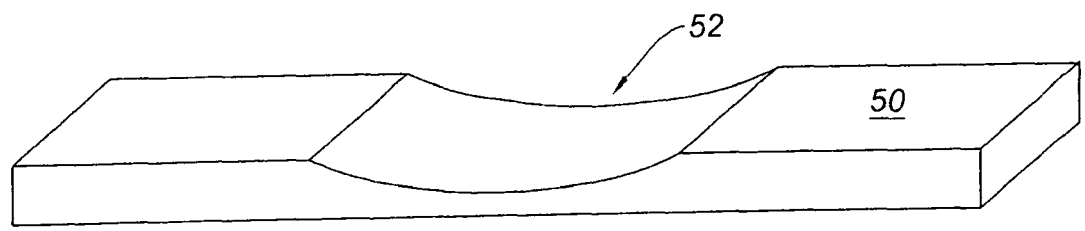
FIG. 5 shows a mechanical property validation test piece used for regulating a laser build-up welding installation.

According to another feature of the invention, this regulating operation is performed by carrying out tests on what are called regulating test pieces. These test pieces 50 shown in FIGS. 5 to 7 make it possible:

to check visually for the absence of oxidation and to measure the geometry of the build-up weld;
to evaluate the metallurgical quality of the build-up weld after machining, with and without heat treatment, by destructive and non-destructive tests, such as a dye penetration test and micrographic sections; and
to characterize the laser build-up welded Ti17 material, after machining and heat treatment, in terms of mechanical properties, that is to say by carrying out cyclic fatigue (HCF) tests.

It is preferable to use a bar obtained from a forged blisk blank, as it then has a fiberizing direction of the same nature as the blisks that will be repaired with such an installation.

Figure 6:
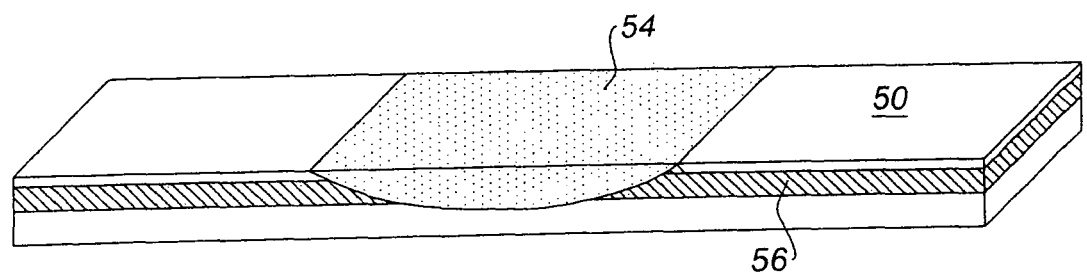
FIG. 6 shows the test piece of FIG. 5 after build-up welding.
Figure 7:
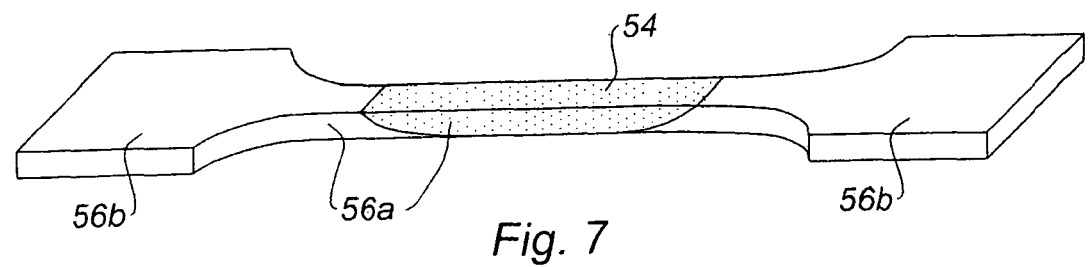
FIG. 7 shows the specimen for the cyclic fatigue tests cut out from the build-up welded test piece of FIG. 6.

A parallelepipedal bar 50 with a cut-out depression 52, the profile geometry of which corresponds to a cavity that will be cut out from a damaged zone of the leading edge or trailing edge of an aerofoil, is build-up welded in order to form a zone to be repaired. The bar is wider than an aerofoil. This depression 52 is build-up welded by means of the machine that it is desired to validate. Owing to the width of the bar, the build-up welding is carried out by crossing the various layers. When the weld has been completed, as shown in FIG. 6, with possibly a few overhangs, considered to be of no consequence, a slice 56 is cut from the bar. This slice 56, shown hatched in FIG. 6, includes the build-up welded portion 54. FIG. 7 shows this slice 56, which has been machined in order to obtain a central portion 56a forming a bar incorporating the build-up weld zone. In its central portion, the entire thickness of the bar 56a is made of build-up weld material. On either side of the bar 56a, wider tabs 56b form tabs for being gripped in the jaws of the machine in which the cyclic fatigue tests are carried out.

When the tests on the regulating test pieces are satisfactory, it is considered that the regulating of the installation is complete. The blisk repair run can then be carried out. Between two blisk repair runs, it is unnecessary to carry out a run for regulating the installation. Suffice is to verify that the start-of-run and end-of-run test pieces give satisfactory build-up welding results.

The invention claimed is:

1. A method of repairing a turbomachine one-piece bladed disc or blisk having at least one damaged zone, by build-up of metal in said damaged zone by means of a laser build-up welding machine, comprising:

preparing the damaged zone by machining the damaged zone so as to obtain a zone of defined profile to be repaired;
preparing a start-of-run test piece by machining a test zone, the test zone including the defined profile such that the test zone in the start-of-run test piece has the same geometry as the machined damaged zone in the blisk;

build-up welding of the start-of-run test piece using the laser build-up welding machine, the operating parameters of the laser build-up welding machine being preset;

validating the operating parameters of the laser build-up welding machine by checking a geometric quality and a metallurgical quality of the test piece and determining if the test piece meets criteria for acceptance;

build-up welding of the zone to be repaired of the blisk using the laser build-up welding machine with the validated operating parameters; and re-working the repaired zone.

2. The method according to claim 1, further comprising, after build-up welding the zone to be repaired of the blisk, preparing an end-of-run test piece by machining a test zone, the test zone including the defined profile such that the test zone in the end-of-run test piece has the same geometry as the test zone in the start-of-run test piece and the machined damaged zone in the blisk, build-up welding the end-of-run test piece, and checking the geometric quality and the metallurgical quality of the end-of-run test piece.

3. The method according to claim 1, wherein the constituent metal of the disc is a titanium alloy.

4. The method according to claim 3, wherein the build-up weld metal is the titanium alloy.

5. The method according to claim 3, wherein constituent metal of the disc is Ti17 or TA6V.

6. The method according to claim 1, wherein the damaged zone is located on an aerofoil tip.

7. The method according to claim 1, wherein the damaged zone is a leading-edge corner or trailing-edge corner of an aerofoil.

8. The method according to claim 1, wherein the damaged zone is located on a leading edge or trailing edge of an aerofoil.

9. The method according to claim 1, wherein the build-up welding is performed by melting a filler metal by a laser beam.

10. The method according to claim 1, in which the disc has at least two damaged zones, said two zones being repaired after treatment of the start-of-run test piece.

11. The method according to claim 1, further comprising regulating the build-up welding installation, during which regulating the operating parameters are preset, by build-up welding a regulating test piece, and checking geometric quality and metallurgical quality of the build-up weld by at least one of non-destructive or destructive testing.

12. The method according to claim 11, wherein the test piece has a profile of a zone to be build-up welded of a leading edge or trailing edge of an aerofoil of said disc.

13. The method according to claim 12, wherein the checking metallurgical quality by at least one of non-destructive or destructive testing includes a fatigue test carried out on a test specimen machined from the test piece after the build-up welding.

14. The method according to claim 11, wherein the regulating test piece is cut from a forged blisk blank.

15. The start-of-run test piece for implementing the method according to claim 1, wherein the test piece includes a titanium alloy, and the shape of which test piece simulates the tip of an aerofoil with a sealing lip.

16. The start-of-run test piece for implementing the method according to claim 1, wherein the test piece includes a titanium alloy, and the shape of which test piece simulates a leading-edge or trailing-edge corner of an aerofoil tip machined according to said defined profile.

17. The method according to claim 1, wherein the laser build-up welding machine includes a nozzle, the nozzle including a plurality of channels which feed a metal powder that is deposited on the zone to be repaired along a laser beam propagation axis.

18. The method according to claim 17, wherein the build-up welding comprises progressively building up a stack of layers of material deposited on the zone to be repaired by moving the nozzle of the laser build-up welding machine forward and backward along the zone to be repaired, and the build-up welding is performed at a constant speed and intensity.

19. The method according to claim 1, wherein the defined profile includes a curved portion and a straight portion connected to the curved portion.

\* \* \* \* \*

UNITED STATES PATENT AND TRADEMARK OFFICE
CERTIFICATE OF CORRECTION

| | | |
|---|---|---|
| PATENT NO. | : 8,049,132 B2 | Page 1 of 1 |
| APPLICATION NO. | : 11/360658 | |
| DATED | : November 1, 2011 | |
| INVENTOR(S) | : Bernard Bouet et al. | |

It is certified that error appears in the above-identified patent and that said Letters Patent is hereby corrected as shown below:

Column 4, line 28, delete "IS" before "trailing"

Signed and Sealed this

Thirty-first Day of January, 2012

David J. Kappos
*Director of the United States Patent and Trademark Office*